US008584214B2

(12) United States Patent
Upp et al.

(10) Patent No.: US 8,584,214 B2
(45) Date of Patent: Nov. 12, 2013

(54) SECURE SERVER CERTIFICATE TRUST LIST UPDATE FOR CLIENT DEVICES

(75) Inventors: Steven D. Upp, Bartlett, IL (US); Alexander Medvinsky, San Diego, CA (US); Madjid F. Nakhjiri, San Diego, CA (US)

(73) Assignee: Motorola Mobility LLC, Libertyville, IL (US)

( * ) Notice: Subject to any disclaimer, the term of this patent is extended or adjusted under 35 U.S.C. 154(b) by 520 days.

(21) Appl. No.: 12/233,279

(22) Filed: Sep. 18, 2008

(65) Prior Publication Data

US 2010/0071040 A1    Mar. 18, 2010

(51) Int. Cl.
*H04L 29/06*    (2006.01)

(52) U.S. Cl.
USPC .................. 726/6; 726/2; 713/156; 380/200; 380/201; 709/225; 709/227; 709/228

(58) Field of Classification Search
USPC .................. 726/2, 6; 713/156; 380/200, 201; 709/227, 228, 225
See application file for complete search history.

(56) References Cited

U.S. PATENT DOCUMENTS

| | | | |
|---|---|---|---|
| 6,513,116 B1 | 1/2003 | Valente | |
| 6,816,900 B1 * | 11/2004 | Vogel et al. | 709/225 |
| 7,240,194 B2 | 7/2007 | Hallin et al. | |
| 8,281,371 B1 * | 10/2012 | Chickering et al. | 726/4 |
| 2009/0070474 A1 * | 3/2009 | Aura et al. | 709/228 |
| 2009/0158409 A1 * | 6/2009 | Khosravi | 726/6 |
| 2009/0300743 A1 * | 12/2009 | Ma et al. | 726/6 |
| 2010/0030897 A1 * | 2/2010 | Stradling | 709/225 |
| 2010/0185849 A1 * | 7/2010 | Rune et al. | 713/156 |

OTHER PUBLICATIONS

Schossmaier, Klaus: "The International Search Report and the Written Opinion of the International Searching Authority, or the Declaration", European Patent Office, Rijswijk, completion date: Oct. 22, 2009, mailing date: Oct. 29, 2009.

\* cited by examiner

*Primary Examiner* — Brandon Hoffman
*Assistant Examiner* — Hee Song

(57) ABSTRACT

A method, a network element, and a client device for creating a trusted connection with a network are disclosed. A client device 104 may attempt to access a sub-network 106. The client device 104 may determine that a certificate of the sub-network 106 is issued by a certification authority absent from a device certificate trust list. The client device 104 may receive via the sub-network 106 a certificate trust list update 400 from a certificate trust list provider 108.

19 Claims, 7 Drawing Sheets

| CTL Provider ID 402 | CTL Timestamp 404 | Root Certificate 406 | New CA 408 |

| Certificate Check Indicator 610 | CTL Provider Location 620 |
| Element ID 612 | Service Provider ID 614 | |

SECURE SERVER CERTIFICATE TRUST LIST UPDATE FOR CLIENT DEVICES

1. FIELD OF THE INVENTION

The present invention relates to a method and system for authenticating network elements. The present invention further relates to updating a certificate trust list.

2. INTRODUCTION

A certification authority (CA) may issue a certificate to a communication entity, such as a network, sub-network, or website, to ensure the trustworthiness of that entity. A client device that seeks access to the communication entity or receives information from the communication entity may request the certificate. The client device may then compare the certificate for the certification authority of the certificate with a certificate trust list stored by the client device. For simplicity in this situation, the certificate authority may be referred to as being present on the certificate trust list. If the certification authority is present on the certificate trust list, the client device may connect with the communication entity or accept the information received from the communication entity with full assurances. If the certification authority is not present on the certificate trust list, the client device may choose to avoid connecting with the communication entity or accepting the information received from the communication entity, till such time as the communication entity is vouched as safe. The absence of a certification authority from a certificate trust list may not necessarily mean that the communication entity is not safe, as the certificate trust list may not be up to date.

BRIEF DESCRIPTION OF THE DRAWINGS

Understanding that these drawings depict only typical embodiments of the invention and are not therefore to be considered to be limiting of its scope, the invention will be described and explained with additional specificity and detail through the use of the accompanying drawings in which:

FIG. 4 is a block diagram that illustrates one embodiment of a certificate trust list update.

FIG. 6 is a block diagram that illustrates one embodiment of an initial sub-network message.

DETAILED DESCRIPTION OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The present invention comprises a variety of embodiments, such as a method, an apparatus, and an electronic device, and other embodiments that relate to the basic concepts of the invention. The electronic device may be any manner of computer, mobile device, or wireless communication device.

A method, a network element, and a client device for creating a trusted connection with a network are disclosed. A client device may attempt to access a sub-network and receive a certificate from a network element of the sub-network, such as an authentication, authorization, and accounting (AAA) server. The client device may determine that a certificate of the sub-network is untrustworthy due to the fact that the certificate or certificates is from an issuing certification authority absent from a device certificate store. Alternatively, the entire chain of trust for the network element certificate may be missing from the device certificate store. The client device may receive via the sub-network a certificate trust list update from a certificate trust list provider in a manner that may limit the interactions with the sub-network to modification of the certificate trust list. The client may then attach to the sub-network again and verify the identity of the sub-network.

Figure 1:
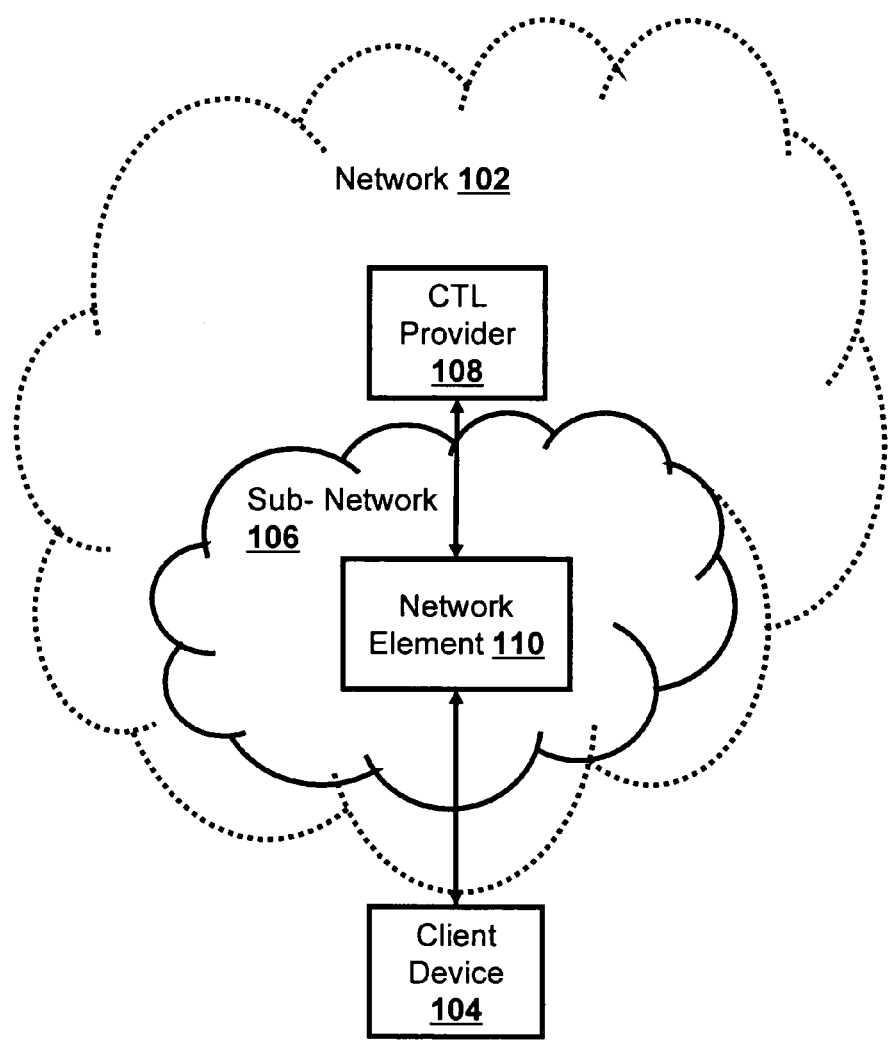
FIG. 1 illustrates one embodiment of a communication system.

FIG. 1 illustrates one embodiment of a communication system 100. The communication system 100 may include a network 102 and a client device 104. Various communication devices may exchange data or information through the network 102. The network 102 may be an internet protocol (IP) network such as a local area network (LAN), a wide area network (WAN), a wireless local area network (WLAN), the internet or any other type of network. Various communication devices of the network may be grouped into a sub-network 106. The sub-network 106 may, among other services, be an access network or a control network, to provide access to a greater network or to provide configuration information, such as a certificate trust list (CTL), to a client device 110. Member devices of the sub-network 106 may be certified by a certification authority, testifying to the authenticity and trustworthiness of each member device. The sub-network may be a channel in an internet protocol television (IPTV). The chain of trust for each trusted certification authority for each sub-network may be stored on a CTL, maintained by a CTL provider 108. The CTL provider 108 may be a server or other readily accessible storage source of a CTL.

The client device 104 may connect to the sub-network 106 via a network element 110. For one embodiment, the network element 110 may be a distributed set of servers in the network, including an AAA server. The client device 104 may be one of several types of handheld devices, such as, a mobile phone, a laptop, or a personal digital assistant (PDA). For one embodiment, the client device 104 may be a WiFi capable device, a WiMax capable device, or other wireless devices. The wireless devices may transmit data using cellular packet data formats such as general packet radio service (GPRS), enhanced data rates for global evolution (EDGE), universal mobile telecommunications system (UMTS), evolution data optimized (EvDO) format, or other cellular packet data formats. In one embodiment, the client device 104 may connect to the network 102 via a wireline or virtual private network (VPN) access. The WiFi capable device may be used to access the network 102 for data or by voice using voice over Internet protocol (VOIP).

Figure 2:
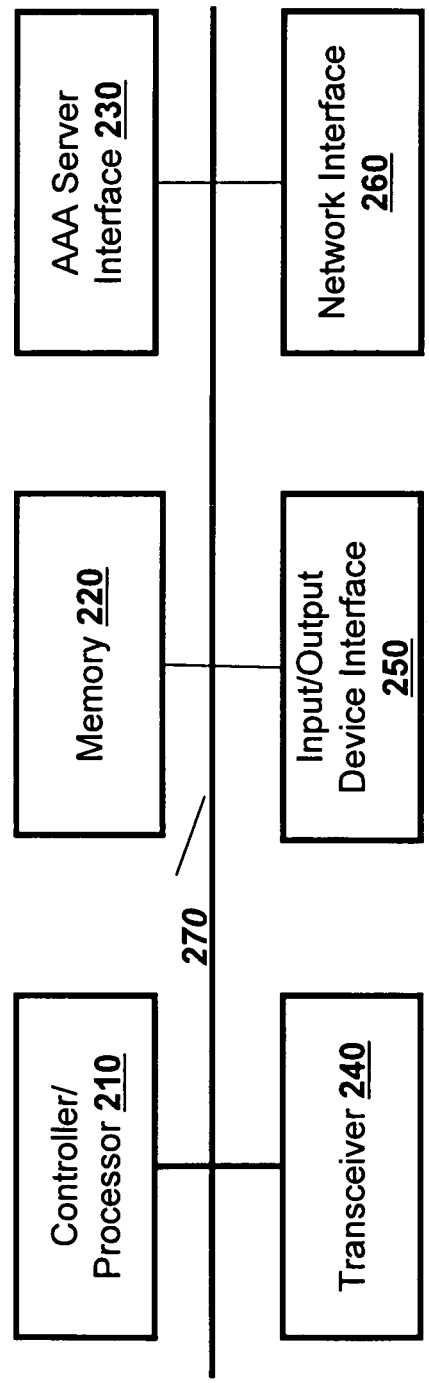
FIG. 2 illustrates a possible configuration of a computing system to act as an access point.

FIG. 2 illustrates a possible configuration of a computing system to act as a network element 110. The network element 110 may include a controller/processor 210, a memory 220, an AAA server interface 230, a transceiver 240, input/output (I/O) device interface 250, and a network interface 260, connected through bus 270. The network element 110 may implement any operating system, such as Microsoft Windows®, UNIX, or LINUX, for example. Client and server software may be written in any programming language, such as C, C++, Java or Visual Basic, for example. The server software may run on an application framework, such as, for example, a Java® server or .NET® framework.

The controller/processor 210 may be any programmed processor known to one of skill in the art. However, the method for authenticating a connection with a client device 104 may also be implemented on a general-purpose or a special purpose computer, a programmed microprocessor or microcontroller, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, any device or devices capable of implementing the method for authenticating a connection with a client device as described herein may be used to implement the system functions of this invention.

The memory 220 may include volatile and nonvolatile data storage, including one or more electrical, magnetic or optical memories such as a random access memory (RAM), cache, hard drive, or other memory device. The memory may have a cache to speed access to specific data. The memory 220 may also be connected to a compact disc-read only memory (CD-ROM), digital video disc-read only memory (DVD-ROM), DVD read write input, tape drive, or other removable memory device that allows media content to be directly uploaded into the system.

The network element 110 may have an AAA server interface 230 to interact with an AAA server. The network element 110 may use the AAA server to regulate and control access of the sub-network 106 by the client device 104. The AAA server may store a certificate from a certification authority, as well as any updates to the CTL. The AAA server may typically interact with the client device through the network element 110, acting as a pass-through entity. The AAA server may own a certificate issued by the certificate authority. The AAA server may present this certificate to the client device as part of an access control authentication process.

The transceiver 240 may create a data connection with the client device 104. The I/O device interface 250 may be connected to one or more input devices that may include a keyboard, mouse, pen-operated touch screen or monitor, voice-recognition device, or any other device that accepts input. The I/O device interface 250 may also be connected to one or more output devices, such as a monitor, printer, disk drive, speakers, or any other device provided to output data. The I/O device interface 250 may receive a data task or connection criteria from a network administrator.

The network interface 260 may be connected to a communication device, modem, network interface card, a transceiver, or any other device capable of transmitting and receiving signals from the network 104. The network interface 260 may act as a sub-network interface. The network connection interface 260 may be used to connect a client device to a network. The components of the network element 110 may be connected via an electrical bus 270, for example, or linked wirelessly.

Client software and databases may be accessed by the controller/processor 210 from memory 220, and may include, for example, database applications, word processing applications, as well as components that embody the functionality of the present invention. The network element 110 may implement any operating system, such as Microsoft Windows®, LINUX, or UNIX, for example. Client and server software may be written in any programming language, such as C, C++, Java or Visual Basic, for example. Although not required, the invention is described, at least in part, in the general context of computer-executable instructions, such as program modules, being executed by the electronic device, such as a general purpose computer. Generally, program modules include routine programs, objects, components, data structures, etc. that perform particular tasks or implement particular abstract data types. Moreover, those skilled in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like.

Figure 3:
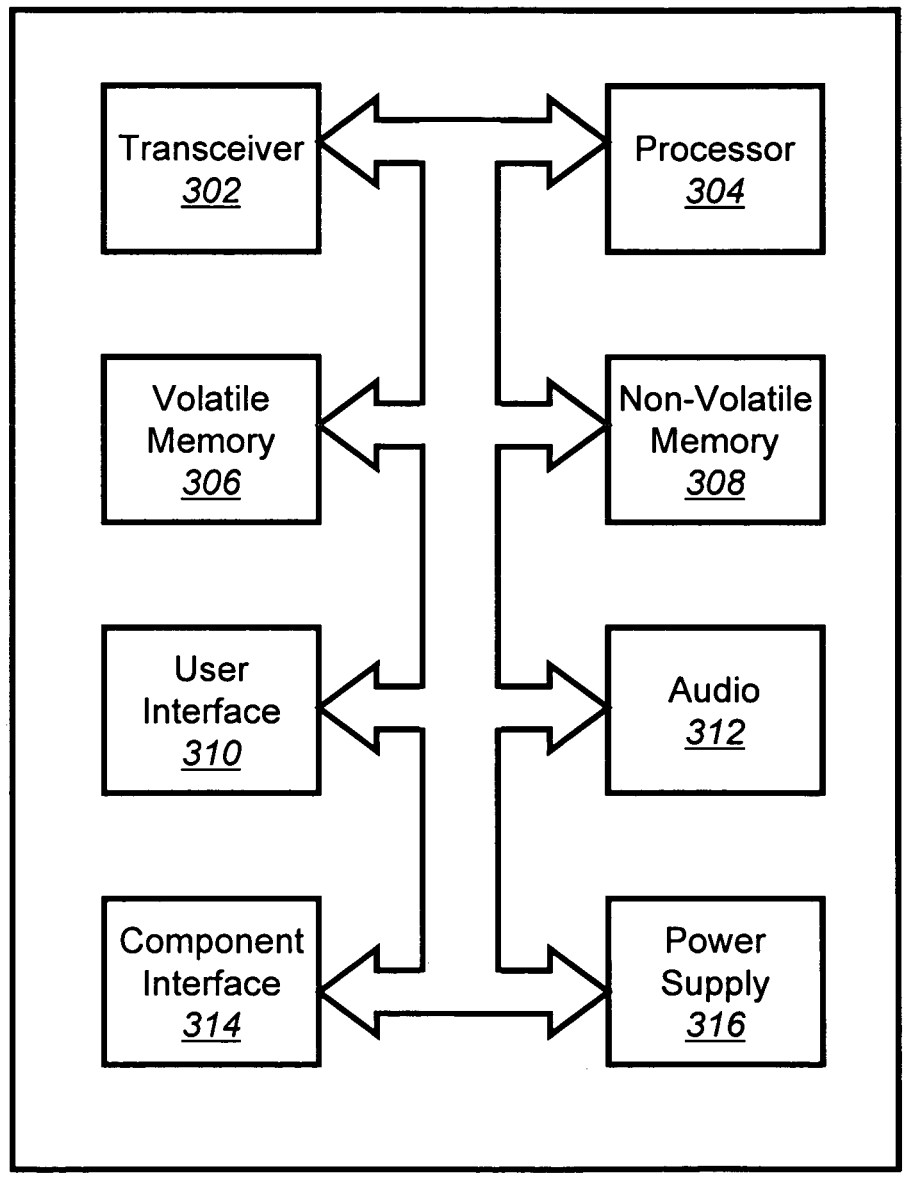
FIG. 3 is a block diagram that illustrates one embodiment of a user communication device, or terminal, capable of acting as a client device.

FIG. 3 illustrates one embodiment of a user communication device, or terminal, capable of acting as a client device 104. The client device 104 may be capable of accessing the information or data stored in the network 102 or sub-network 106. For some embodiments of the present invention, the client device 104 may also support one or more applications for performing various communications with the network 102 or sub-network 106. The client device 104 may be a handheld device, such as, a mobile phone, a laptop, or a personal digital assistant (PDA). For some embodiments of the present invention, the client device 104 may be WiFi® capable device, which may be used to access the network 102 or sub-network 106 for data or by voice using VOIP.

The client device 104 may include a transceiver 302, which is capable of sending and receiving data over the network 102 or sub-network 106. The client device 104 may include a processor 304 that executes stored programs. The client device 104 may also include a data storage, such as a volatile memory 306 or a non-volatile memory 308, which are used by the processor 304. The client device 104 may store a CTL in a certificate store in the non-volatile memory 308. The client device 104 may include a user input interface 310 that may comprise elements such as a keypad, display, touch screen, and the like. The client device 104 may also include a user output device that may comprise a display screen and an audio interface 312 that may comprise elements such as a microphone, earphone, and speaker. The client device 104 also may include a component interface 314 to which additional elements may be attached, for example, a universal serial bus (USB) interface. Finally, the client device 104 may include a power supply 316.

The CTL update may be stored upon the AAA server associated with the network element 110 or maintained at the CTL provider 108. FIG. 4 illustrates one embodiment of a CTL update 400. The CTL update may be signed by an authority, with a certificate that the client device 104 trusts. The CTL update 400 may have a CTL provider identifier 402 to allow a client device 104 to identify the CTL provider 108 and to protect the client device 104 from receiving a spoofed CTL 400. The CTL update 400 may have a CTL timestamp 404 to allow a client device 104 to determine if the CTL update 400 predates the CTL stored by the client device 104 in the non-volatile memory 308. The CTL update 400 may have a root certificate 406 indicating the originating trusted source. The CTL provider 108 may determine from a timestamp sent by the client device 104 what new CAs 408 are required by the client device 104 and send just the new CAs 408 to improve transmission efficiency.

Figure 5:
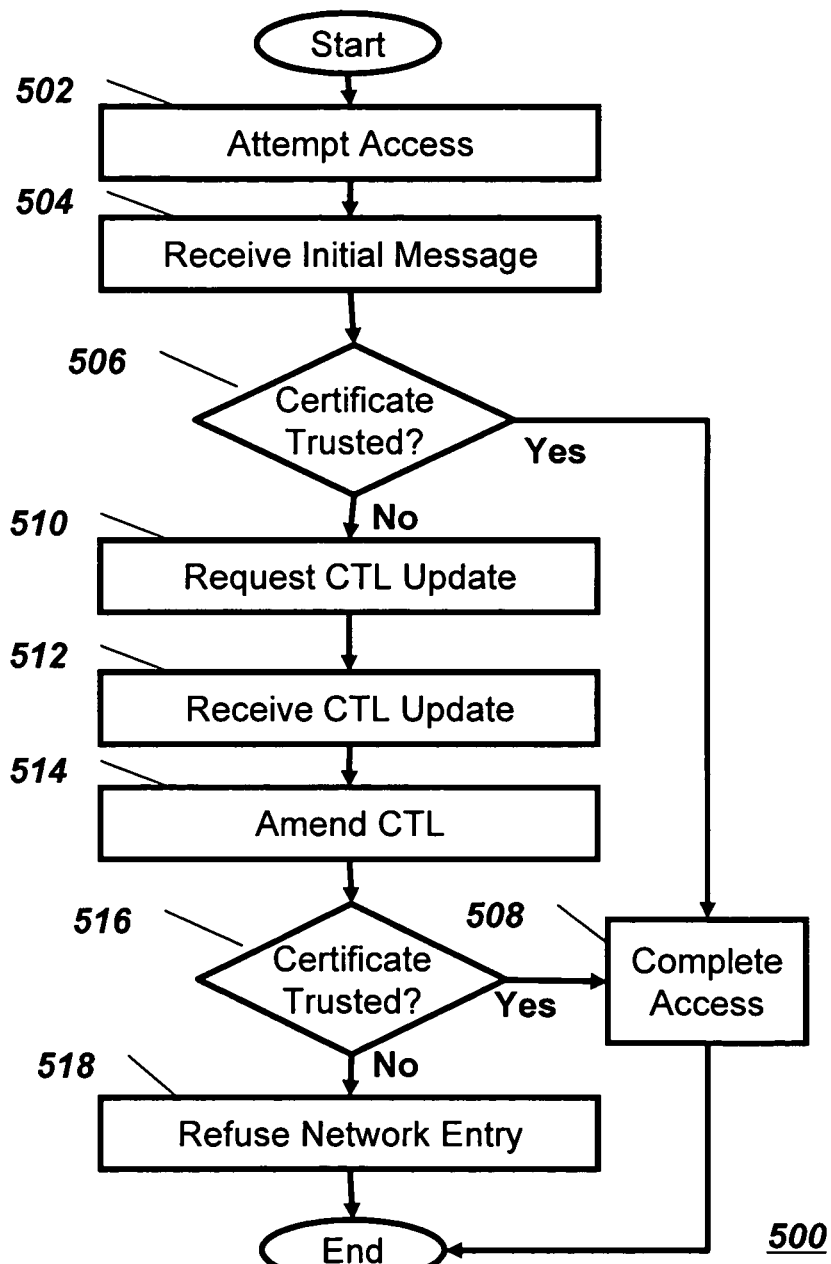
FIG. 5 is a flowchart that illustrates one embodiment of a method for updating the certificate trust list with a certificate trust list update stored at the access point.

FIG. 5 illustrates one embodiment of a method 500 for updating the CTL with a CTL update 400 stored at the network element 110 or at a location accessible by the network element 110. The client device 104 may attempt to access the sub-network 106 (Block 502). The client device 104 may receive an initial message with a certificate check indicator from the sub-network 106, prompting the client device 104 to check the certificate of the sub-network 106 against the device CTL (Block 504). If the certificate for the network element 110, such as an AAA server, is issued by a certification authority on the device CTL (Block 506), then the client device 104 may complete access to the sub-network 106 (Block 508). If the certificate or root certificate for the network element 110 is absent from the device CTL (Block 506), then the client device 104 may request a CTL update 400 (Block 510). The client device 104 may receive a CTL update 400 stored on the network element 110 (Block 512). The network element may send the CTL update 400 in the form of a media access control (MAC) layer message to the client device 104. The client device 104 may amend the CTL based upon the CTL update 400 (Block 514). If the certificate for the sub-network 106 is issued by a certification authority on the updated device CTL (Block 516), then the client device 104 may complete access to the sub-network 106 (Block 508). If the certificate for the sub-network 106 is issued by a certification authority absent from the update device CTL (Block 516), then the client device 104 may refuse network entry and seek out an alternative sub-network (Block 518).

FIG. 6 illustrates one embodiment of an initial sub-network message 600. The initial sub-network message 600 may have a certificate check indicator 610, or a piece of data that may prompt the client device to check the certificate of the sub-network against the device CTL. The certificate check indicator may be an identifier (ID) 612 of the network element 110 or an ID 614 of the service or network provider. The initial sub-network message may also have data informing the client device 104 of the location 620 of the CTL provider 108.

Figure 7:
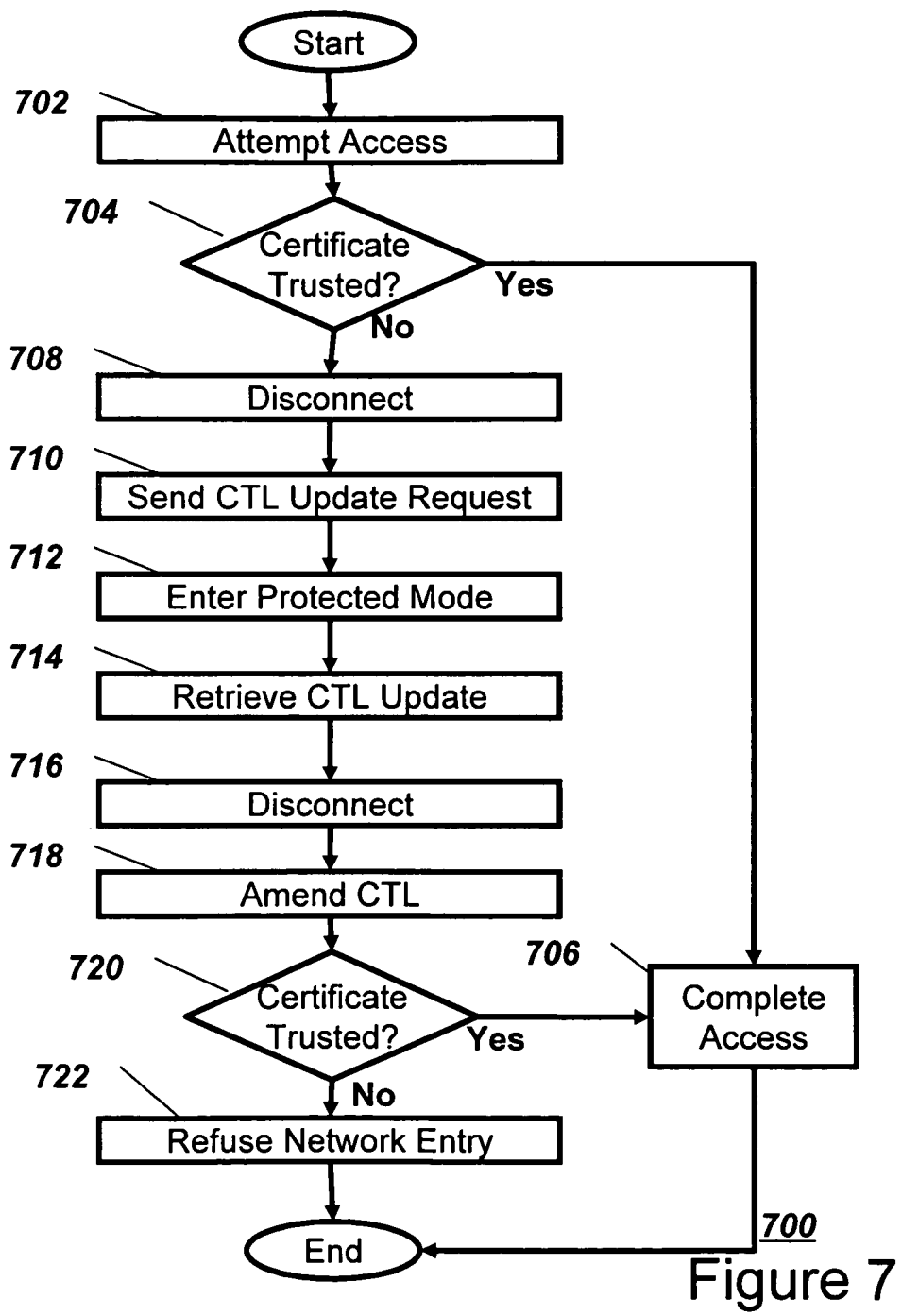
FIG. 7 is a flowchart that illustrates one embodiment of a method for updating the certificate trust list using a protected access mode with disconnect.

FIG. 7 illustrates one embodiment of a method 700 for updating the CTL using a protected access mode with disconnect. The client device 104 may attempt to access the sub-network 106 (Block 702). If the certificate for the sub-network 106 is issued by a certification authority on the device CTL (Block 704), then the client device 104 may complete access to the sub-network 106 (Block 706). If the certificate for the sub-network 106 is issued by a certification authority absent from the device CTL (Block 704), then the client device 104 may disconnect from the sub-network 106 (Block 708). The client device 104 may include with a network entry a CTL update request to the network element 110 that the client device 104 is seeking a CTL update 400 (Block 710). The client device 104 may include an update request flag as part of a network access identifier (NAI) before sending the NAI to the network element 110 of the sub-network. The client device 104 may enter the sub-network 106 in a protected access mode (712). The protected mode may allow the client device 104 to access the sub-network in a limited fashion, only accepting messages from the CTL provider 108. The client device 104 may retrieve the CTL update 400 from the CTL provider 108 (Block 714). The client device 104 may disconnect from the sub-network 106 (Block 716).

The client device 104 may amend the CTL based upon the CTL update 400 (Block 718). If the certificate for the sub-network 106 is issued by a certification authority on the updated device CTL (Block 720), then the client device 104 may complete access to the sub-network 106 in an open access mode, allowing unfettered access to the sub-network 106 (Block 706). If the certificate for the sub-network 106 is issued by a certification authority absent from the update device CTL (Block 720), then the client device 104 may refuse network entry and seek out an alternative sub-network (Block 722).

Figure 8:
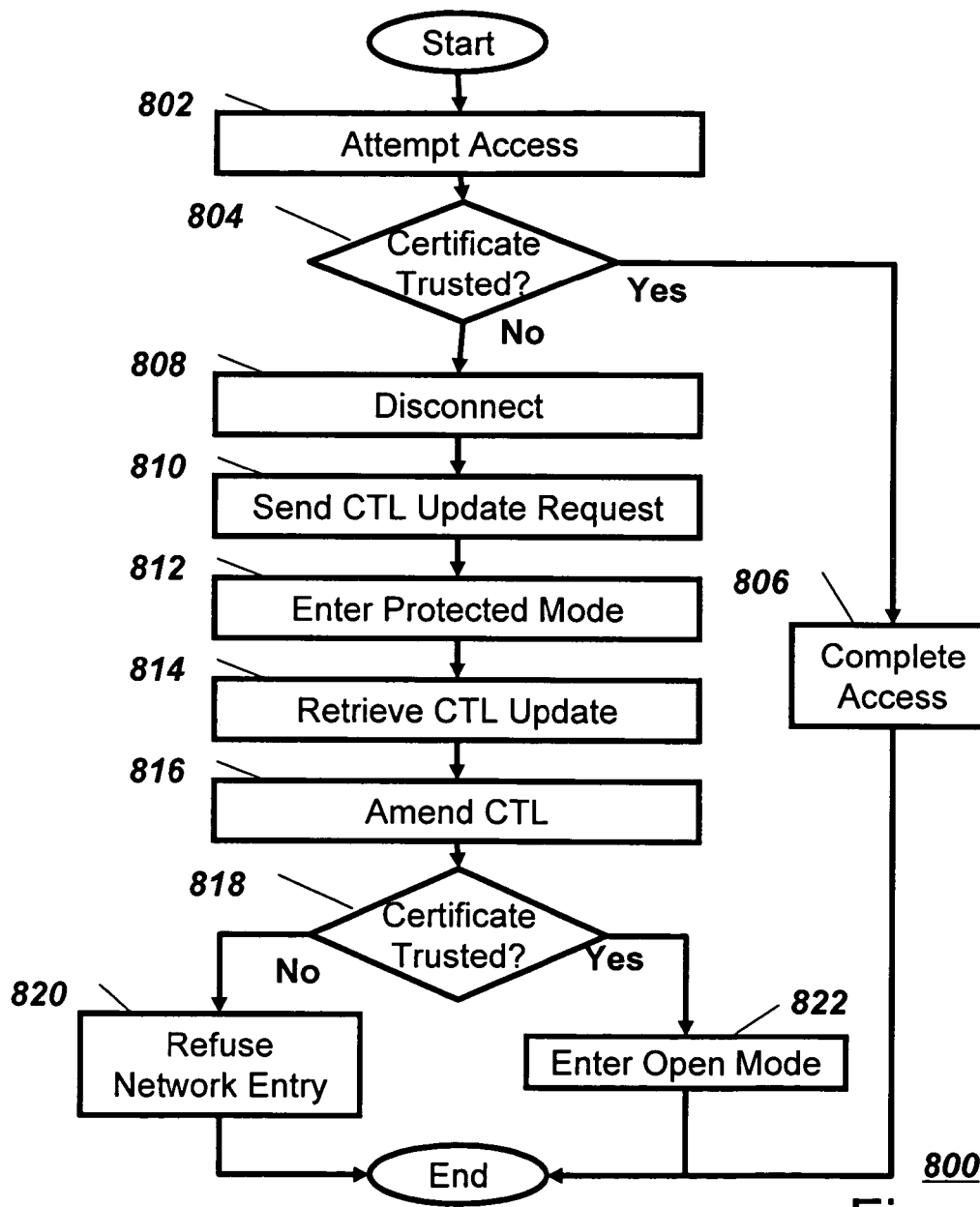
FIG. 8 is a flowchart that illustrates one embodiment of a method for updating the certificate trust list with a protected access mode without disconnect.

FIG. 8 illustrates one embodiment of a method 800 for updating the CTL with a protected access mode without disconnect. The client device 104 may attempt to access the sub-network 106 (Block 802). If the certificate for the sub-network 106 is issued by a certification authority on the device CTL (Block 804), then the client device 104 may complete access to the sub-network 106 (Block 806). If the certificate for the sub-network 106 is issued by a certification authority absent from the device CTL (Block 804), then the client device 104 may disconnect from the sub-network 106 (Block 808). The client device 104 may append an update request flag, indicating that a CTL update 400 is requested, as part of a network entry (Block 810). The client device 104 may include the update request flag as part of a network access identifier (NAI) before sending the NAI to the network element 110 of the sub-network. The client device 104 may enter the sub-network 106 in a protected access mode (812). The client device 104 may retrieve the CTL update 400 from the CTL provider 108 (Block 814). The client device 104 may amend the CTL based upon the CTL update 400 (Block 816). If the certificate for the sub-network 106 is issued by a certification authority absent from the update device CTL (Block 818), then the client device 104 may refuse network entry and seek out an alternative sub-network (Block 820). If the certificate for the sub-network 106 is issued by a certification authority on the updated device CTL (Block 818), then the client device 104 may enter an open access mode, allowing unfettered access to the sub-network 106 (Block 822).

Much like network access service provided to a mobile, wireless device, configuration, monitoring, or specific software application access, such as video, may be considered a service provided to the device. In such scenarios, internet protocol (IP) connectivity may have already been established, but the device may seek information about a server providing a specific service or configuration or software. The device may seek to establish secure sessions with these servers before trusting the information received or making transactions.

Internet protocol television (IPTV) providers may use a remote configuration management server (RCMS). The IPTV receiving device may receive information about various network servers from the RCMS. The address of the RCMS may be provided to the IPTV receiving devices. Dynamic host configuration protocol (DHCP) options may provide the address of the RCMS, a CTL update, a certificate check indicator, or a certificate trust list provider location. If the IPTV receiving device is to establish a secure socket layer (SSL)/transport layer security (TLS) session with or receive signed information from the RCMS server, a trustworthy RCMS certificate may be useful. Thus potentially an IPTV receiving device may deal with an RCMS that possesses a certificate issued by a trust authority that is unrecognizable by the IPTV device.

In addition to using MAC messaging to deliver a CTL update 400 before gaining network entry, a network element 110 may use a network configuration protocol to deliver the CTL as part of IP network connectivity establishment, such as through DHCP or even after the IP network connectivity is established, as part of a configuration protocol, such as network configuration (NETCONF). In such cases, the network element 110 may deliver the CTL update 400 as an option or an extension to the network protocol.

One DHCP option may provide the uniform resource locater (URL) or other access information for the RCMS, such as a subject name and CA name for the RCMS certificate. If the IPTV receiving device determines that it does not recognize the CA name, the IPTV device may request that a CTL be downloaded as a different DHCP option to prevent SSL/TLS failure.

NETCONF protocol may be used to manage network devices, retrieve configuration data information, and upload and manipulate new configuration data. The NETCONF protocol may allow the device to expose a full, formal application programming interface (API). Applications may use the API to send and receive full and partial configuration data sets. Any IPTV service that may use configuration information in order to set the service up may receive such information through setting up a NETCONF connection with the configuration or service providing servers.

The NETCONF protocol may use a remote procedure call (RPC) paradigm. A client may send one or more RPC requests, to which the server may respond with a series of RPC replies. The RPC replies may communicate a CTL update, a certificate check indicator, or a certificate trust list provider location to the client device 104. NETCONF protocol exchanges may be typically carried over a transport protocol. The RPC requests and responses may be encoded in extendable markup language (XML). As NETCONF connections may provide integrity and confidentially protection, the NETCONF connections may be carried over TLS or secure shell (SSH). When NETCONF connections are used for configuration, the device may establish a TLS session to provide the underlying secure connection for a NETCONF connection with a NETCONF server, with a recognizable and trustworthy certificate. After the TLS and NETCONF connection is set up, the IPTV device may download the CTL as part of NETCONF protocol exchange and determine the address for a CTL provider through the NETCONF protocol. For example, configuration data may be carried as part of a <config> element that is formatted based on the specific data model used within the device. Alternatively, the CTL and related information may be communicated to the device as a "capability". The server may advertise the availability of a CTL download service for a variety of service providers, treating the content of the element as opaque data.

The network element 110 may include the CTL as a TLS extension to the TLS exchange. The client device 104 may use the "trusted_CA_indication" extension to indicate to the server which CAs are trusted, so the network element 110 may use one of those CAs. Thus, the network element 110 may send the CTL update 400 to the client device 104 as a sub-network access message, such as a dynamic host configuration protocol option, a NETCONF configuration protocol using a remote procedure call, or a transport layer security exchange.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the invention are part of the scope of this invention. For example, the principles of the invention may be applied to each individual user where each user may individually deploy such a system. This enables each user to utilize the benefits of the invention even if any one of the large number of possible applications do not need the functionality described herein. In other words, there may be multiple instances of the electronic devices each processing the content in various possible ways. It does not necessarily need to be one system used by all end users. Accordingly, the appended claims and their legal equivalents should only define the invention, rather than any specific examples given.

We claim:

1. A method for updating a device certificate trust list in a client device to establish IP network connectivity or transport layer security, comprising:
   determining, via the client device, that a certificate of a chain of trust of a sub-network is absent from the device certificate trust list;
   accessing, via the client device, the sub-network in protected mode if the certificate of the chain of trust of the sub-network is absent from the device certificate trust list, where the protected mode enables limited sub-network access and enables acceptance of certificate trust list update messages from a certificate trust list provider;
   receiving, in the protected mode at the client device via the sub-network, a certificate trust list update from the certificate trust list provider having a MAC layer signaling payload, wherein the certificate trust list update includes a former absent certificate of chain of trust of the sub-network;

installing the certificate trust list update within the client device;

amending the certificate trust list on the client device based upon the installed certificate trust list update having the former absent certificate of chain of trust of the sub-network; and completing access control authentication process, for accessing the sub-network, using the installed certificate trust list update to establish IP network connectivity or transport layer security for the client device.

2. The method of claim 1, wherein the certificate trust list update was stored at the client device.

3. The method of claim 1, further comprising:
receiving via the client device at least one of a certificate check indicator and a certificate trust list provider location.

4. The method of claim 1, further comprising:
sending a certificate trust list update request from the client device to a network element of the sub-network.

5. The method of claim 1, further comprising:
disconnecting from the sub-network upon receipt of the certificate trust list update from the certificate trust list provider;
amending the device certificate trust list with the certificate trust list update; and
connecting to the sub-network in an open access mode.

6. The method of claim 1, further comprising:
amending the device certificate trust list with the certificate trust list update; and
switching from the protected mode to an open access mode.

7. The method according to claim 1, wherein the certificate trust list update comprises:
a certificate trust list provider identifier; and
the former absent certificate of chain of trust of the sub-network.

8. The method according to claim 7, wherein the certificate trust list update comprises:
a certificate trust list time stamp of the certificate trust list update; and
a root certificate indicating an originating trusted source.

9. The method according to claim 1, further comprising:
attempting to access the sub-network; and
wherein determining comprises determining, via the client device, that the certificate of the chain of trust of the sub-network is absent from the device certificate trust list while attempting to access the sub-network.

10. The method according to claim 1, wherein the certificate of the chain of trust authenticates the trustworthiness of an entity of the sub-network and the certificate trust list update includes a certificate that the client device trusts.

11. A client device for accessing a sub-network, comprising:
a data storage that stores the device certificate trust list;
a processor that determines that a certificate of a chain of trust of a sub-network is absent from the device certificate trust list; wherein the processor performs the following steps:
determining, via the client device, that a certificate of a chain of trust of a sub-network is absent from the device certificate trust list;
receiving, in a protected mode, via the sub-network, a certificate trust list update from a certificate trust list provider having a MAC layer signaling payload, wherein the certificate trust list update includes a former absent certificate of chain of trust of the sub-network;
installing the certificate trust list update within the client device;
amending the certificate trust list on the client device based upon the installed certificate trust list update having the former absent certificate of chain of trust of the sub-network; and
completing access control authentication process using the installed certificate trust list update to establish IP network connectivity or transport layer security for the client device; and
a transceiver that receives via the sub-network a certificate trust list update from a certificate trust list provider;
wherein the transceiver performs the following steps:
accessing, via the client device, the sub-network in protected mode if the certificate of the chain of trust of the sub-network is absent from the device certificate trust list, where the protected mode enables limited sub-network access and enables acceptance of certificate trust list update messages from a certificate trust list provider;
disconnecting from the sub-network upon receipt of the certificate trust list update from the certificate trust list provider;
amending the device certificate trust list with the certificate trust list update; and
connecting to the sub-network in an open access mode.

12. The client device of claim 11, wherein the transceiver receives the certificate trust list update in a sub-network access message from a network element.

13. The client device of claim 11, wherein the transceiver sends a network access identifier with an update request flag to a network element of the sub-network.

14. The client device of claim 11, wherein the processor disregards any transmission not from the certificate trust list provider as part of a protected mode.

15. The client device of claim 14, wherein:
the processor amends the device certificate trust list with the certificate trust list update; and
the transceiver disconnects from the sub-network upon receipt of the certificate trust list update from the certificate trust list provider and connects to the sub-network in an open access mode.

16. The client device of claim 14, wherein the processor amends the device certificate trust list with the certificate trust list update and switches to an open access mode.

17. A network element for at least one of controlling, establishing IP network connectivity or establishing transport layer security for a client device to a sub-network, comprising:
a processor that processes a certificate trust list update request from a client device;
a transceiver that transmits to the client device a certificate trust list update from a certificate trust list provider having a media access control message; wherein the certificate trust list update includes a former absent certificate of chain of trust of the sub-network, where the certificate trust update list is transmitted in a protected mode if a certificate of the chain of trust of the sub-network is absent from a device certificate trust list, where the protected mode enables limited sub-network access between the client device and the sub-network and enables transmission of certificate trust list update messages from a certificate trust list provider to the client device;

a means for amending the certificate trust list on the client device based upon the transmitted certificate trust list update having the former absent certificate of chain of trust of the sub-network; and a means for completing access control authentication process, for accessing the sub-network, to establish IP network connectivity or transport layer security with the client device.

18. The network element of claim 17, further comprising:
a data storage that stores a certificate trust list update.

19. The network element of claim 17, further comprising:
a sub-network interface that allows the client device to access the certificate trust list provider in a protected mode.

\* \* \* \* \*